United States Patent [19]
Jacob et al.

[11] Patent Number: 5,591,414
[45] Date of Patent: Jan. 7, 1997

[54] SORPTIVE CATALYST FOR THE SORPTIVE AND OXIDATIVE CLEANING OF EXHAUST GASES FROM DIESEL ENGINES

[75] Inventors: Eberhard Jacob, Tutzing; Michael Harris, Münster, both of Germany

[73] Assignee: MAN Nutzfahrzeuge Aktiengesellschaft, München, Germany

[21] Appl. No.: 499,674

[22] Filed: Jul. 7, 1995

[30] Foreign Application Priority Data

Jul. 9, 1994 [DE] Germany ............... 44 24 235.2

[51] Int. Cl.$^6$ ............... B01D 53/34; F01N 3/10
[52] U.S. Cl. ............... 422/180; 422/171; 422/177; 422/211; 422/222; 502/326; 502/327; 502/350; 502/351; 502/353; 502/355; 423/213.5
[58] Field of Search ............... 422/169, 171, 422/180, 172, 221, 177, 222, 179, 211; 502/325, 349, 339, 351, 326, 353, 327, 354, 313, 323, 355; 423/213.5

[56] References Cited

U.S. PATENT DOCUMENTS

| | | | |
|---|---|---|---|
| 4,382,880 | 5/1983 | Derrien | 502/323 |
| 4,863,893 | 9/1989 | Farrauto et al. | 502/325 |
| 5,128,305 | 7/1992 | Yoshimoto et al. | 502/326 |
| 5,427,989 | 6/1995 | Kanesaka et al. | 423/213.5 |

FOREIGN PATENT DOCUMENTS

| | | |
|---|---|---|
| 2458888 | 6/1975 | Germany . |
| 4229471 | 3/1994 | Germany . |

*Primary Examiner*—Robert J. Warden
*Assistant Examiner*—Hien Tran
*Attorney, Agent, or Firm*—Robert W. Becker & Associates

[57] ABSTRACT

The invention relates to a sorption catalytic converter for the combined chemo-sorptive and oxidative cleaning of diesel engine exhaust gases with a high blocking activity for highly volatile organic exhaust gas components, compounds sorbed on particles, moderately and scarcely volatile organic compounds (SOF), materials with a pungent odor, irritating materials, and ammonia, using an upstream $NO_x$ reducing catalytic converter, with measurable blocking activity for minute high carbon particles, with a high oxidation activity for CO and a restricted oxidation activity for NO and $SO_2$ with a working range from the ambient temperature to 650° C., comprising a monolithic honeycomb structure having channels adapted for free flow of diesel exhaust gas therethrough of the active mass or of inert carrier material, coated with the active mass, the active mass preferably being composed of $V_2O_5/WO_3/MoO_3$ mixed oxides borne on sulfatized titanium dioxide, same being doped with platinum metal oxides at a concentration very low in comparison with oxidation catalytic converters, for increasing sorption and oxidation activity. The active mass is employed with 250–1400 g/l coating composition, whereas for oxidation catalytic converters 50–200 g/l of coating composition is typical. The significant inhibition of oxidation activity as compared with $SO_2$ and NO results from a dilution effect (low level of platinum metal; high active mass) and a possible multi-layer structure with a platinum-free or platinum-depleted covering layer. The enhancement of the sorption and oxidation activity is rendered possible by the employment of covering layers with a high pore volume on a honeycomb structure consisting of an active mass whose pore volume is moderately high for reasons of mechanical strength.

12 Claims, 6 Drawing Sheets

FEED: 800ppm NO, 10ppm DECAN, 20ppm SO$_2$
RG: 13.000 h$^{-1}$

SORPTIVE CATALYST FOR THE SORPTIVE AND OXIDATIVE CLEANING OF EXHAUST GASES FROM DIESEL ENGINES

BACKGROUND OF THE INVENTION

The invention relates to a sorption catalyst for the combined sorptive and oxidative cleaning of the exhaust gases of diesel engines.

THE PRIOR ART

A catalytic converter of this type is described in the German patent publication 42 29 471 A. In this case diesel exhaust gas flows through a sorption-oxidation (SO for short) catalytic converter. It has turned out that with such a catalytic converter the emission of highly volatile organic compounds (HVOC) and of moderately and scarcely volatile compounds (SOF) sorbed on particles and of minute carbon-rich particles may be reduced.

An SO catalytic converter comprises a monolithic catalyst body with passages allowing free passage therethrough. The catalyst body consists either completely of the active composition of the SO catalytic converter or is produced by coating an inert catalytic carrier with the said active composition of the SO catalytic converter. The latter is free of platinum metals and consists of solid acids with a high surface area in the system $V_2O_5/WO_3/TiO_2/SiO_2/Al_2O_3$ in a partially sulfatized and/or phosphatized form of the carrier material $TiO_2$ in the anatase modification. Retention of HVOC and SOF takes place in the case of SO catalytic converter at temperatures below 170° C. predominantly by chemisorption and at higher temperatures by oxidation, high sorption and oxidation activity smoothly merging into each other. The SO catalytic converter is considerably restricted as regards its oxidation activity with respect to $SO_2$ and NO.

A disadvantage of such a system is the poor CO oxidation activity and the formation of CO and traces of partly extremely pungent carboxylic acids owing to partial oxidation of volatile organic exhaust gas components. At least a quarter of the amount of carbon of the organic exhaust gas components is oxidized to CO.

An SO catalytic converter saturated with volatile organic compounds (VOC) after running an engine (at approximately 100° C.) desorbs a part of the sorbed VOC's without conversion on switching over to load and a higher rpm of the engine; simultaneously, owing to partial oxidation of the sorbed VOC's, pungent organic oxygen compounds, as for example a series of alkylcarboxylic acids $C_nH_{2n+1}COOH$ (n=0–6) will be formed.

For particularly highly volatile organic compounds sorption activity is frequently excessively low so that for example low molecular weight olefines, such as ethene and propene, are not retained to any great degree at 100° C.

In the known set-up the SO catalytic converter is followed by a platinum oxidation catalytic converter. This catalytic converter does suffer from the disadvantage that its oxidation activity hardly develops under approximately 200° C. At temperatures above 400° C. substantial $SO_2$ oxidation is to be observed.

A general disadvantage of the known system is, in comparison with oxidation catalytic converters, the relatively low space velocity and surface velocity, set by design, which lead to a relatively large volume of the SO catalytic converter.

If an SO catalytic converter is preceded by a reduction catalytic converter (SCR catalytic converter) for $NO_x$ reduction with ammonia or urea as reducing agents, $NH_3$ will be stored at temperatures below 250°–300° C. by sorption and oxidized at temperatures in excess of 450° C. to $N_2$. For the important working temperature range between 300° C. and 450° C. however no $NH_3$ blocking action is found.

SHORT SUMMARY OF THE INVENTION

Accordingly one object of the present invention is to provide a sorption oxidation catalytic converter for the cleaning of diesel exhaust gas, which possesses a sufficiently high CO oxidation activity, which avoids partial oxidation with the formation of undesired pungent odors and whose sorption activity for HVOC's and blocking activity is increased on increasing load and the speed of rotation after running cold. Inhibition of $SO_2$ and NO oxidation activity is to be maintained.

This and other objects appearing herein are to be achieved employing the features that a sorption catalytic converter for the combined sorptive and oxidative cleaning of exhaust gases of diesel engines (sorption-oxidation catalytic converter or SO catalytic converter) with a blocking activity (sorption and oxidation activity) for highly volatile organic exhaust gas components and moderately and scarcely volatile organic exhaust gas components adsorbed on particles and possibly for ammonia with an oxidation activity for CO and with an inhibited oxidation activity for $SO_2$ and NO, the active composition being made up of solid acids with a high surface area in the system $V_2O_5/WO_3/TiO_2/SiO_2/Al_2O_3/SO_4^{2-}/PO_4^{2-}$, characterized in that the active composition is doped with platinum metals in the form of the oxides thereof, more particularly platinum (Pt) and palladium (Pd) for increasing the blocking activity.

The catalytic converter of the present invention is thus primarily characterized by the following features:
a doped catalytically active material, the doped catalytically active material comprised of a solid acid system $V_2O_5/SiO_2/TiO_2/Al_2O_3/SO_4^{2-}/PO_4^{3-}$ of a high surface area; and
the doped catalytically active material being doped with at least one metal oxide of a metal of the platinum group of the periodic table, for increasing the blocking activity of the catalytic converter.

Preferably, the blocking activity may also be active for ammonia.

The doped catalytically active material is advantageously in the form of a honeycomb structure and the honeycomb structure is made of 300–1400 g, preferably 400–800 g, of the doped catalytically active material per liter volume of the honeycomb structure.

Expediently, the catalytic converter further comprises a honeycomb support structure, wherein the doped catalytically active material is in the form of a coating applied to the support structure and wherein the coating is made of 200–800 g, preferably 300–600 g, of the doped catalytically active material per liter volume of the honeycomb support structure.

The doped catalytically active material advantageously contains 0.001% to 0.1% of the at least one metal oxide of a metal of the platinum group.

The solid acid system may further comprise $WO_3$ and/or $MoO_3$.

Preferably, the catalytic converter further comprises an additional catalytically active material applied as a coating to the doped catalytically active material. The additional active material has a different chemical composition than the solid acid system of the doped catalytically active material and a different pore structure than the doped catalytically active material.

Expediently, the pore volume of the additional catalytically active material is greater than 35%.

Preferably, the additional catalytically active material is free of platinum.

Accordingly the invention provides a sorption catalytic converter, with which in a working temperature range extending from ambient temperature (during a cold start) up to 650° C. there is a possibility of substantially reducing the emission of the diesel engine exhaust gas components:

1. Highly volatile organic compounds (HVOC's).
   A: Compounds which are gaseous at ambient temperature (boiling point <25° C.), for example propane and formaldehyde.
   B: Compounds (such as decane) with a boiling point between 25° and 200° C., which completely pass through particle measuring filters (at 52° C.).
   C: Moderately volatile compounds (such as tridecane) with a boiling point between 200° and 300° C., which are partly deposited in a particle measuring filter (at 52° C.). (HVOC's are fully detected using an FID instrument operating at 190° sorption and oxidation are even further facilitated on changing from class A to class C).

2. Moderately and scarcely volatile organic compounds (SOF or soluble organic fraction of diesel particles) adsorbed on particles. SOF's are partly detected by an FID instrument operating at 190° C.

3. Substances with a pungent odor and aggressive substances belong in the compound classes 1 and 2.

4. Ammonia, $NH_3$. Emission of $NH_3$ (slip) is to be expected from diesel engines when using urea or $NH_3$ SCR technology for reducing $NO_x$.

5. Carbon monoxide, CO.

Furthermore the emission of minute carbon-rich particles can be detectably reduced, while the undesired oxidation of $SO_2$ and of NO is checked.

A further advantage is that owing to a general increase in sorption oxidation activity a reduction of the overall size of the SO catalytic converter is achieved. Furthermore in connection with a catalytic reduction of $NO_x$ in diesel exhaust gas a $NH_3$ blocking activity in a working temperature range between 300° and 450° C. may be achieved.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 5.

For an explanation of the invention attention should firstly be paid to table 1. The SO catalytic converter of example 1 represents the prior art.

The examples 2 through 5 are produced by impregnation of the SO catalytic converter of example 1 with palladium and/or platinum. Example 6 represents the features of the invention comprising an additional catalytically active material applied as a coating to the doped catalytically active material, the additional active material having a different chemical composition than the solid acid system of the doped catalytically active material and a different pore structure than the doped catalytically active material. Examples 7 and 9 result from the completely and, respectively, partial replacement of tungsten trioxide by molybdenum trioxide. Examples 8 and 10 represent SO catalytic converters containing Pt, Pd and Mo. Example 11 represents a coated catalytic converter wherein the doped catalytically active material is in the form of a coating applied to a support structure and wherein the coating is made of 200–800 g, preferably 300–600 g, of the doped catalytically active material per liter volume of the honeycomb support structrue. To facilitate comparison a commercial diesel oxidation catalytic converter using platinum is included (example V1).

Table 2 shows the results of tests of the sorption and oxidation activity of examples 1 through 11 and of the comparison example V1 with decane, $C_{10}H_{22}$, as a model substance for the HVOC's (classes B and C).

Figure 1:
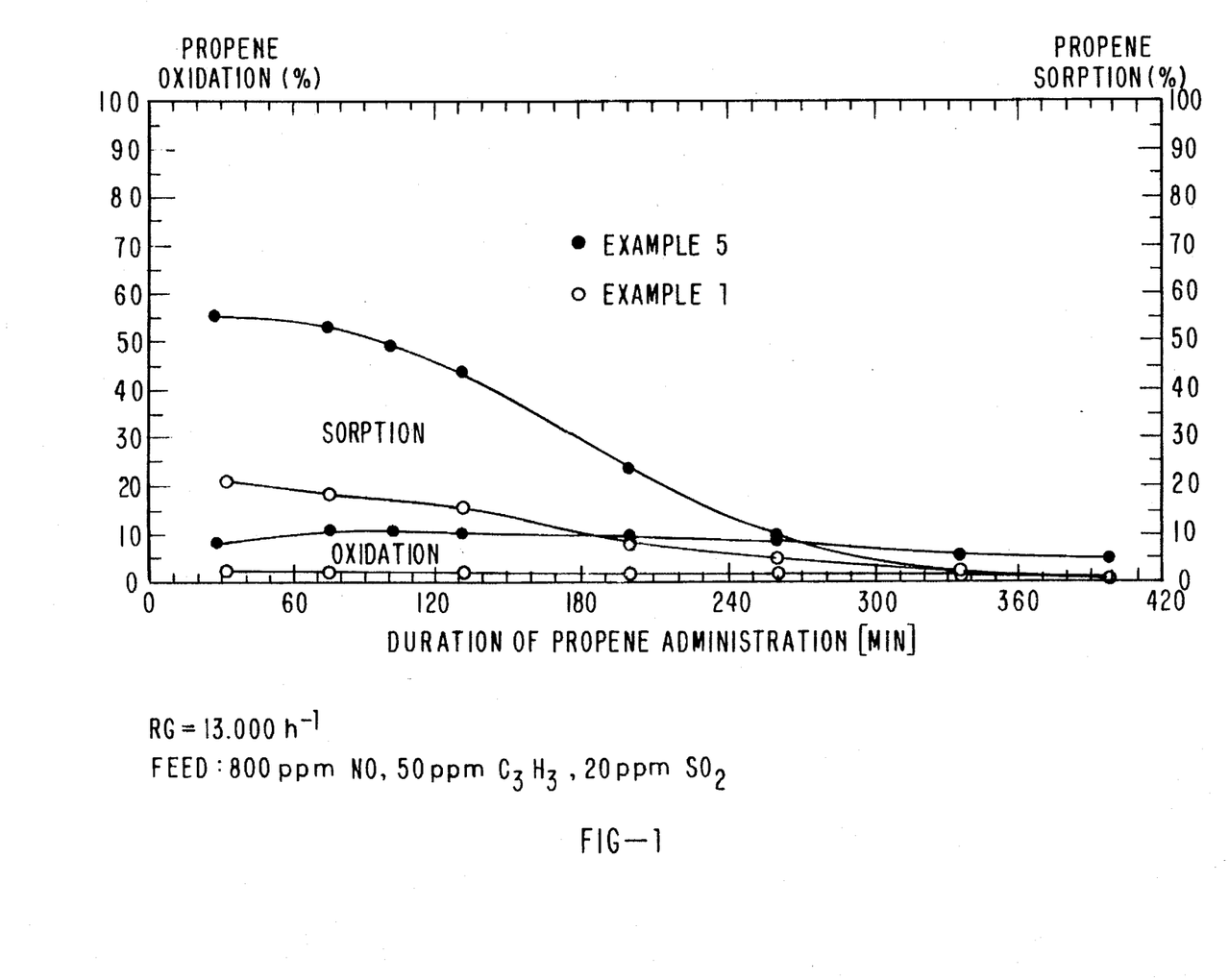
FIG. 1 shows a comparison of sorption and oxidation of propene at 100° C. on an inventive catalytic converter (example 5) and on a prior art catalytic converter (example 1)

The technical advance obtained with the invention is illustrated in FIG. 1 on the basis of the sorption and oxidation of propene, $C_3H_6$, at 100° C. Propene was employed as a model substance for the class A of the HVOF's. At a temperature of 100° C. the example 5 in accordance with the invention shows a sorption activity of 55% as compared with the 20% of the example 1, which is in accordance with the prior art. The initial oxidation activity amounts to 9% in example 5 as compared with 2% in example 1. After 2 hours of administration a further 47% of the $C_3H_6$ in example 5 are sorbed.

Figure 2:
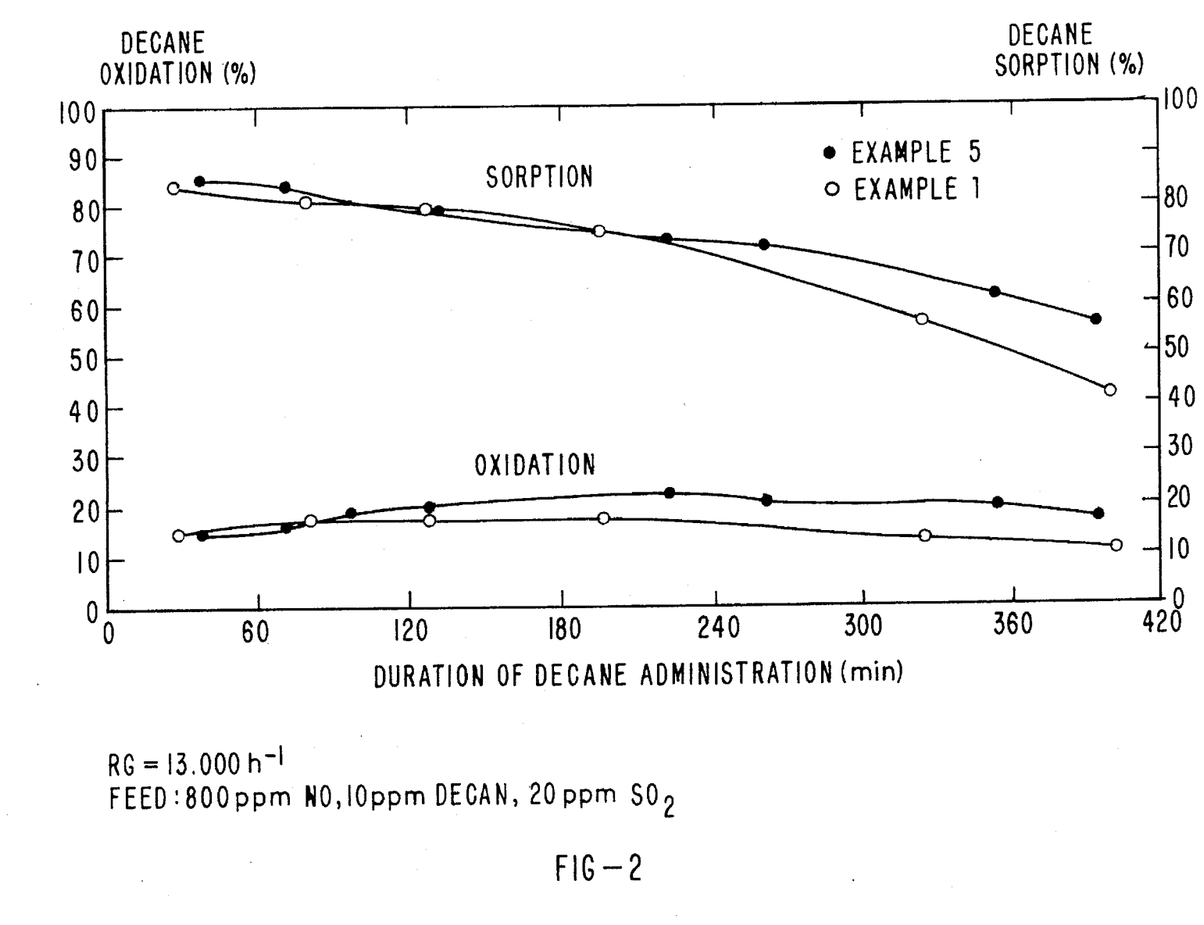
FIG. 2 illustrates a comparison of sorption and oxidation of decane at 100° C. on an inventive catalytic converter (example 5) and on a prior art catalytic converter (example 1)

FIG. 2 takes as an example the sorption and oxidation of decane, $C_{10}H_{22}$, at 100° C. in a manner dependent on the SO catalytic converter and decane administration time. Both in example 1 and also in example 5 there is a complete blockage for passage of decane. After 0.5 hour of administration of decane the sorption fraction amounts to approximately 85% and the oxidation fraction approximately 15%. Differences are only to be noted after some hours of administration of $C_{10}H_{22}$. The example 5 in accordance with the invention maintains its oxidation activity, whereas sorption activity is clearly less reduced during the course of administration than in example 1.

Figure 3:
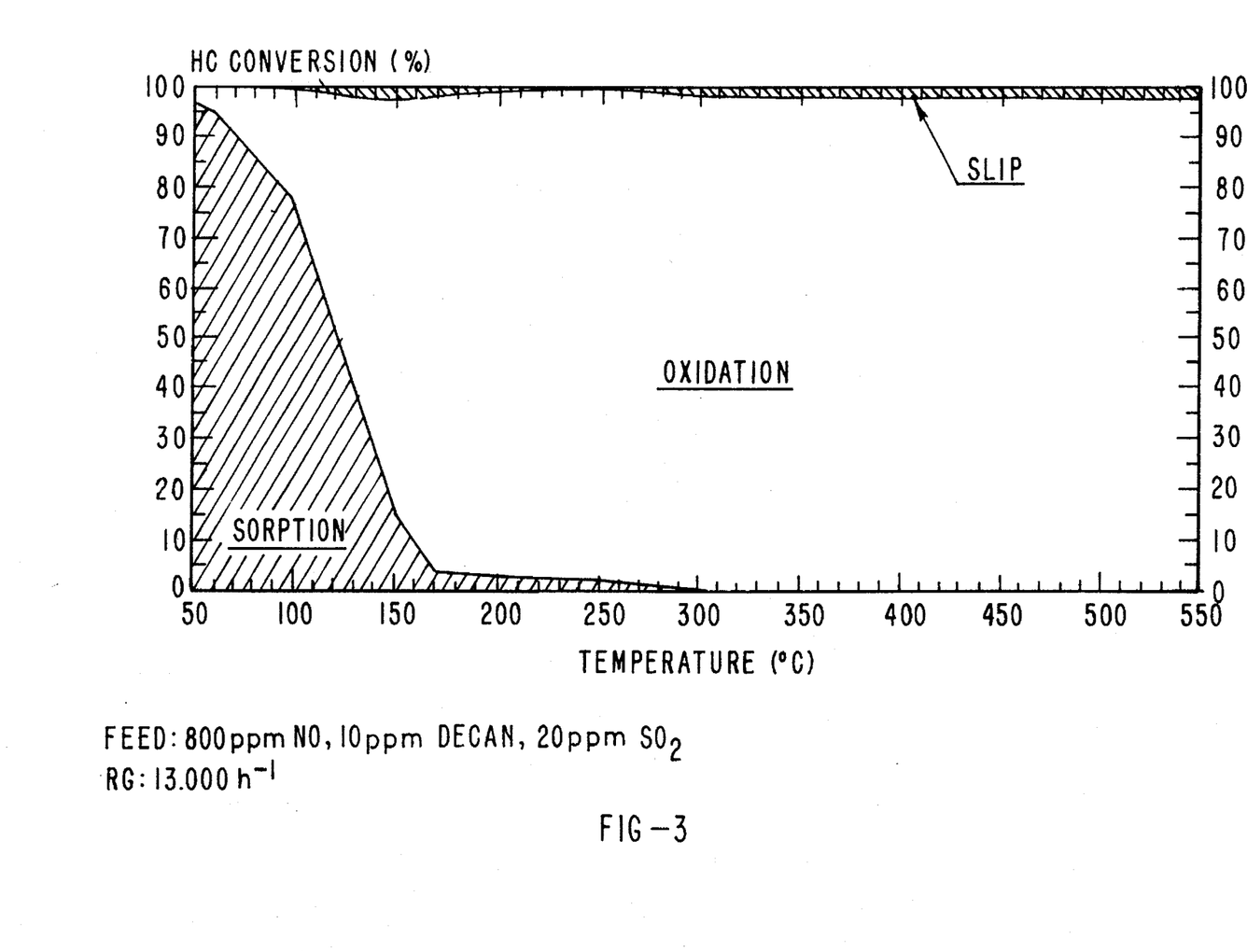
FIG. 3 shows the temperature dependency of sorption and oxidation for decane on an inventive catalytic converter according to example 5.

FIG. 3 shows the temperature dependency of $C_{10}H_{22}$ rate in example 5 when subjected to 10 ppm $C_{10}H_{22}$ (space velocity RG=13,000 per hour). The practically complete blocking activity at temperatures through 50° and 550° C. is noteworthy. Even at 50° C. detectable oxidation occurs, which increases with an increasing temperature. At 50° C. there is a 97% retention of the decane owing to chemisorption with the formation of a chemical surface compound.

The sorption oxidation activity for decane at 100° C. is listed in table 2 for the SO catalytic converter examples 1 through 11 and the comparison example V1. After administration of 20 ppm decane there is then a decane slip to be detected, which in the case of SO catalytic converters free of platinum metal will amount to 36 to 37%. However doping with platinum metals is then able to reduce slip down to 12%. The oxidation of decane in the case of SO catalytic converters doped with platinum metals is more distinct than in the case of SO catalytic converters free of platinum metals, examples 1, 7 and 9. The comparison catalytic converter V1 has neither sorption nor, for that matter, an oxidation activity.

In table 3 the maximum CO concentration is indicated, which on heating (at 100° to 250° C. in 20 minutes) of SO catalytic converter examples, which were previously acted upon with 20 ppm decane at a space velocity of 13,000 per hour, is released as a product of oxidation. Once again the SO catalytic converters free of platinum group metals are distinguished from the rest of the materials because of their high CO emission. SO catalytic converters doped with a platinum group metal on the contrary only involve a low formation of CO.

A further significant difference between the SO catalytic converters free of platinum group metal and those containing platinum group metal is as regards the formation of pungent odors. While the exhaust gas produced during desorption under the conditions of table 3 in the case of SO catalytic converters containing platinum group metal (examples 2 through 6, 8, 10 and 11) is practically free of pungent odor, in the case of the SO catalytic converters of examples 1, 7 and 9 a pungent odor is produced, which is to be attributed to the formation of alkylcarboxylic acids, as for example butyric acid. The intensity of the pungent odor is less in the case of the $MoO_3$ containing SO catalytic converters (examples 7 and 9) than with the $WO_3$ containing SO catalytic converters of example 1.

The blocking activity (in percentages) for $CH_2O$ (20 ppm) and $CH_3COOH$ (20 ppm) was measured at 200° C. and a space velocity of 13,000 per hour in the case of the SO catalytic converter examples

| Example | $CH_2O$ | $CH_3COOH$ |
| --- | --- | --- |
| 1 | 32 | 21 |
| 5 | 89 | 71 |
| 9 | 92 | 76 |

These examples show advantages of the novel system.

Figure 4A:
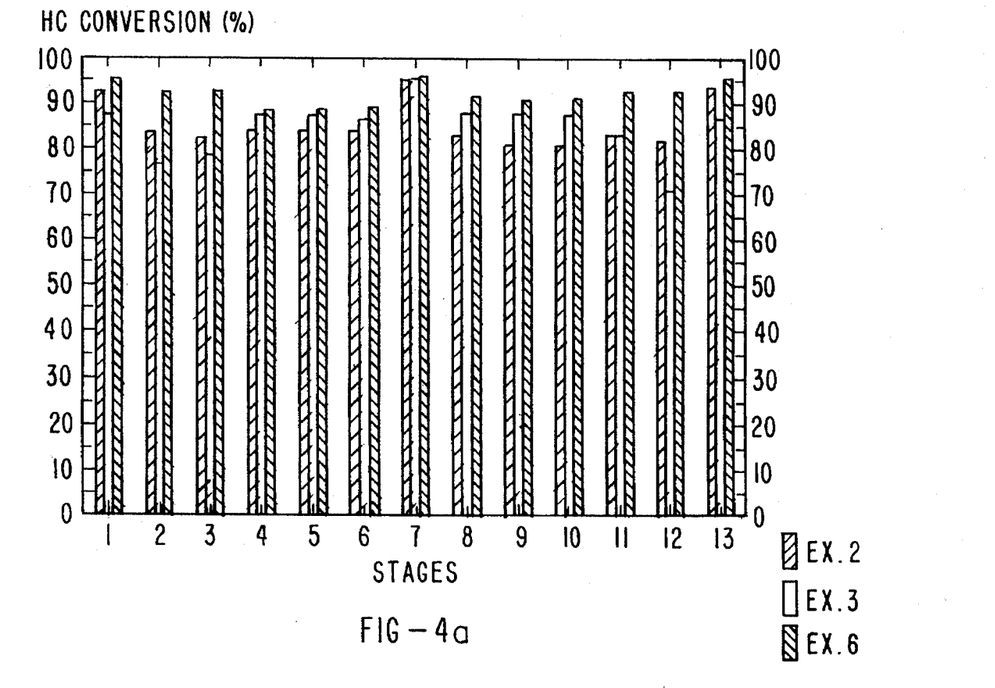
FIG. 4a shows a comparison of the hydrocarbon (HC) conversion rate of three inventive catalytic converters according to examples 2, 3, and 5 in a 13 stage test.
Figure 4B:
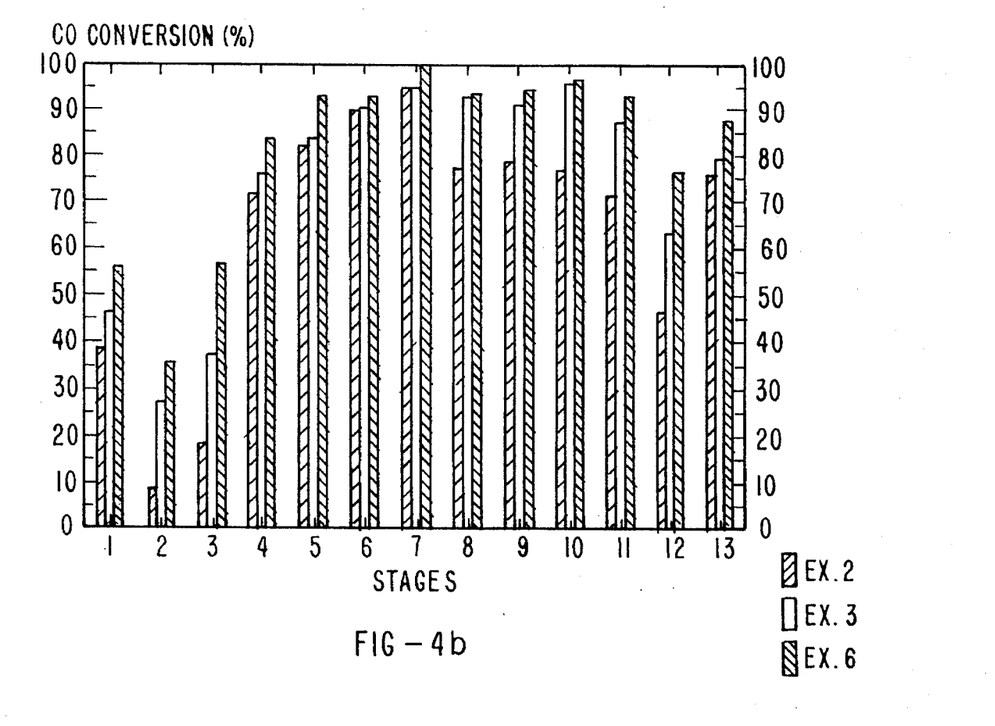
FIG. 4b shows a comparison of the CO conversion rate of three inventive catalytic converters according to examples 2, 3, and 5 in a 13 stage test.
Figure 5:
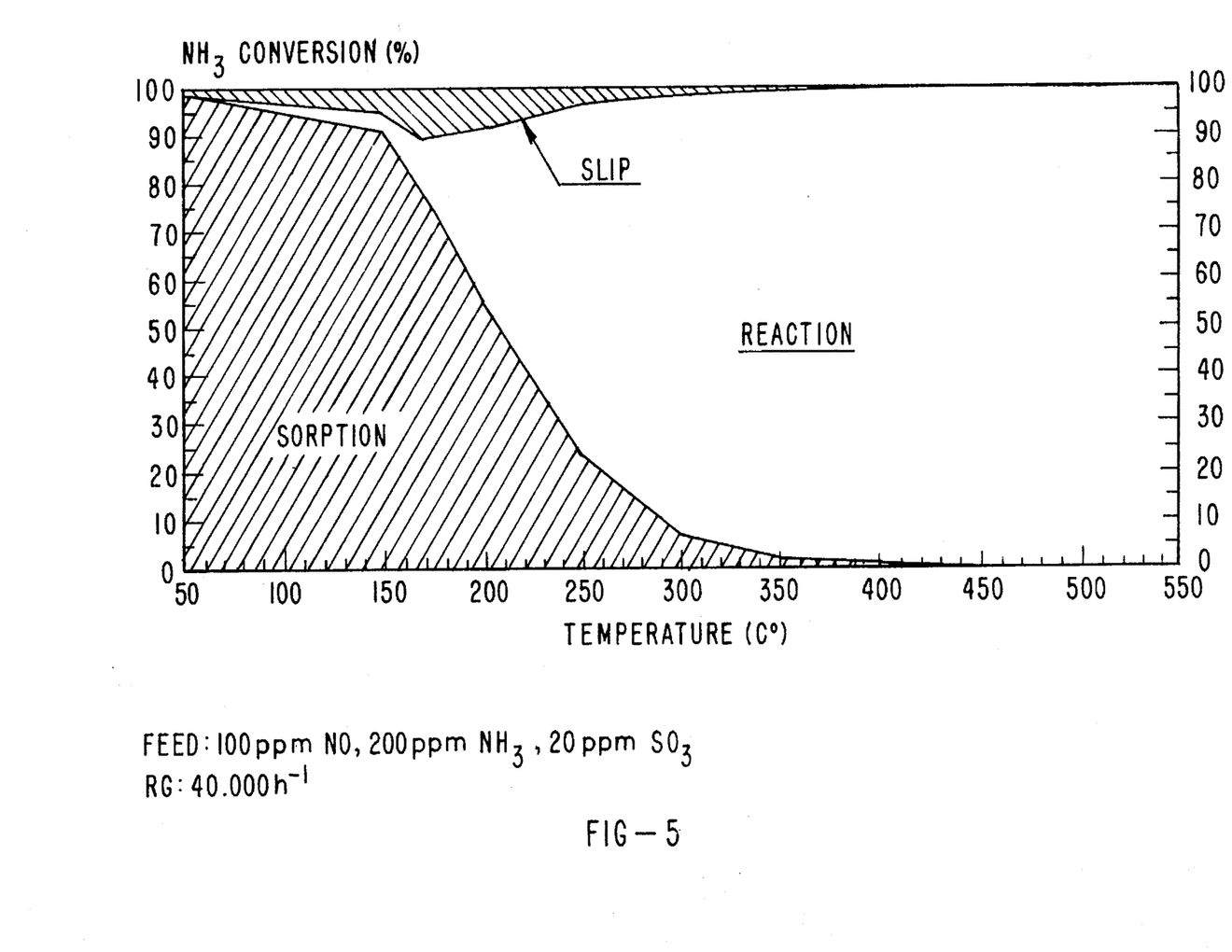
FIG. 5 shows $NH_3$ conversion rate as a function of the temperature at an inventive catalytic converter according to example 6.

The HC and CO conversion rates of the novel SO catalytic converters in accordance with examples 2, 3 and 5 as determined in engines on test beds are indicated in FIGS. 4a and 4b. A test cycle in accordance with European Community regulations 88/77(13 stage test) was run. The HC (hydrocarbon) conversions are over 80% in the case of all test stages. The Pt-Pd SO catalytic converter in accordance with example 5 has somewhat higher conversions than the Pd SO catalytic converter in accordance with example 2 and the Pt SO catalytic converter in accordance with example 3. The HC conversion in the case of example 1 reached a figure of 78% on average. The CO conversions were again highest in the case of the Pt-Pd catalytic converter of example 5. An SO catalytic converter free of platinum group metals as in example 1 did not produce any CO conversion. The CO emission of the engine is increased owing to the CO formation on the SO catalytic converter (example 1) by approximately 30%. Furthermore the formation of pungent odors, more especially of butyric acid, $C_3H_7COOH$, was detected. The addition of platinum group metals prevents the formation of such partly oxidized, high intensity odors from trace components.

Particle measurements in the 13 stage test (see table 4) in the case of the SO catalytic converter examples 2, 3, 5 and 6 showed a reduction in the overall mass of the particles. An analysis of the particles upstream and downstream from the SO catalytic converter produced the values listed in table 4. The SOF conversion rates are quite high in the case of all SO catalytic converters; there are large differences in the $SO_2$ oxidation activity, which leads to sulfatization of the particles. In the case of the SO catalytic converter of example 4 the excessively high Pt charge is responsible for a correspondingly high sulfate formation. In the case of the commercial oxidation catalytic converter sulfate formation is even more pronounced than in example 4.

Figure 6:
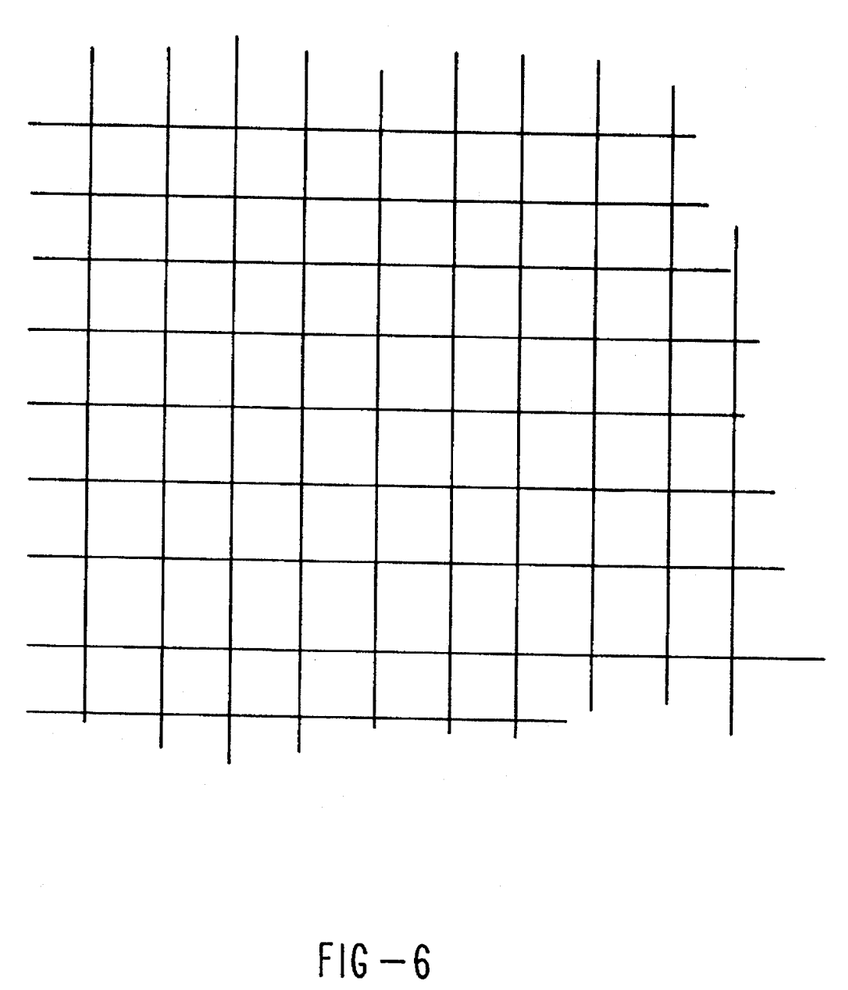
FIG. 6 shows a typical honeycomb structure of a catalytic converter.

The excellent result of example 6 reflects a further development of the invention, in which the honeycomb structure is coated with further active composition (catalytically active material). On the one hand it turned out that an increase in sorption and oxidation activity of the honeycomb structure (schematically represented in FIG. 6) is to be achieved by increasing the pore volume for reducing diffusion controlled transport events. Since however above a pore volume of approximately 35% the mechanical stability of the honeycomb structure is drastically reduced, the honeycomb structure is provided with a thick layer, which may possess a pore volume of 40 to 70%. It will be seen from table 2 that this measure means that the sorption activity is clearly increased as compared with decane. In example 6 the coating composition in accordance with claim 8 is free of platinum. The result of this measure is interpreted to be a significant inhibition of sulfate formation. A further field of application for the sulfate inhibited SO catalytic converter with a enhanced platinum content (example 6) is employment as a sorption and oxidation catalytic converter for blocking $NH_3$ slip in the case of the use of reduction catalytic converters using ammonia or urea as a reducing agent for decreasing nitrogen oxides in diesel exhaust gas. In this case the SO catalytic converter is placed downstream of the reduction catalytic converter. One result of synthetic gas measurement is plotted in FIG. 5: at a space velocity of 40,000 per hour there is practically complete blocking of passage of $NH_3$ at temperatures between 50° and 550° C.

Measurements of aldehyde using the dinitrophenylhydrazine (DNPH) method during cold running of the engine at an SO catalytic converter temperature of 100° C. led in example 5 to a complete degrading of higher aldehydes. It was only possible to show the presence of traces of formaldehyde and acetaldehyde downstream of the SO catalytic converter.

EXAMPLE 1

Honeycomb structures (wall thickness 0.4 mm; 31 cells/ $cm^2$, 1700 $m^2/m^3$ geometrical surface) are so produced by extruding, drying and calcining (4 hours at 600° C.) of a mixture produced in accordance with the German patent publication 2,458,888 C on the sulfate containing $WO_3/TiO_2$ (anatase) and $V_2O_5$ processing adjuvants and structural promoters that the finished honeycomb structure contained 3% $V_2O_5$, 9% $WO_3$, 0.8% $SO_4^{2-}$ (as titanium sulfate), 77% $TiO_2$ (anatase), remainder: structural promoters. The BET surface amounts to 50 $m^2/g$ and the macropore volume 35% with a liter weight of 725 g.

EXAMPLE 2

A honeycomb structure as in example 1 is impregnated with a solution of palladium(II) nitrate in water. The volume of the solution is identical to the pore volume of the honeycomb structure. The palladium concentration of the solution is so selected that the calcined honeycomb structure after drying at 110° C. for 2 hours and calcining at 550° C. contains 0.35 $g/dm^3$ Pd. The palladium is present as palladium oxide, PdO, carried on $WO_3/V_2O_5$.

EXAMPLE 3

A honeycomb structure as in example 1 is impregnated with a solution of tetrammine-platinum(II) hydrogen-carbonate $[Pt(NH_3)_4](HCO_3)_2$, in water. The volume of the solution is identical to the pore volume of the honeycomb structure. The Pt concentration of the solution was so selected that after drying at 110° C. for 2 hours and calcining at 550° C. the honeycomb structure contained 0.071 $g/dm^3$ Pt. The platinum is present as platinum oxide, $PtO_x$, borne on $WO_3/V_2O_5$.

EXAMPLE 4

Production similar to example 3, but with an impregnation to 0.35 $g/dm^3$ Pt.

EXAMPLE 5

Production similar to examples 2 and 3, but with a simultaneous impregnation to 0.35 $g/dm^3$ Pd and 0,071 $g/dm^3$ Pt.

EXAMPLE 6

A honeycomb structure produced as in example 4 is coated with a dispersion of a comminuted and finely ground honeycomb structure as produced in example 1. The coating dispersion consists of 25% wet ground material with grain fractions <50 μm and 0.5% methylcellulose in water. By repeated dipping and drying at 110° C. a and following calcining at 550° C. (2 hours) a liter weight of 200 g is produced. The macropore volume of the coating amounts to 62%.

EXAMPLE 7

The honeycomb structures as for example 7 are produced in manner similar to example 1. The starting material $WO_3/TiO_2$ (10% by weight $WO_3$) is replaced by $MoO_3/TiO_2$ (6.5% by weight $MoO_3$). The calcined honeycomb structure contains 3% $V_2O_5$, 6% $MoO_3$, 0.8% $SO_4^{2-}$ (as titanyl sulfate), 81% $TiO_2$ (anatase), remainder: structural promoters. The BET surface amounts to 55 $m^2/g$ and the macropore volume 36%. The liter weight is 690 g.

EXAMPLE 8

A honeycomb structure produced as in example 7 is coated in a fashion similar to example 5 with 0.35 $g/dm^3$ Pd and 0,071 $g/dm^3$ Pt.

EXAMPLE 9

The honeycomb structures as for example 9 are produced in manner similar to example 1. The starting material $WO_3/TiO_2$(10% by weight $WO_3$) is partially replaced by the oxide mixture by $MoO_3/TiO_2$ (6.5% by weight $MoO_3$). The calcined honeycomb structure contains 3% $V_2O_5$, 4.5% $WO_3$, 3% $MoO_3$, 0.8% $SO_4^{2-}$ (as titanyl sulfate), 79% $TiO_2$ (anatase), remainder: structural promoters. The BET surface amounts to 50 $m^2/g$ and the macropore volume to 35%. The liter weight is 710 g.

EXAMPLE 10

A honeycomb structure produced as in example 9 is coated in a manner similar to example 5 with 0.35 $g/dm^3$ Pd and 0.071 $g/dm^3$ Pt.

EXAMPLE 11

A cordierite carrier of the Corning Glass Company with 31 cells/$cm^2$ and a wall thickness of 0.2 mm is coated in a manner similar to example 6 with a dispersion of wet ground honeycomb structure as in example 5. In this case only the grain fraction <50 μm is employed. After calcining an increase in weight of 500 $g/dm^3$ is found. The macropore volume of the coating amounts to 55%

COMPARISON EXAMPLE 1

Commercially manufactured diesel oxidation catalytic converter with a platinum content of 1.8 $g/dm^3$ and 31 cells/$cm^2$.

EXAMPLE 12

Measurement of Activity with Synthetic Gas.

Using the SO catalytic converter honeycomb structure in accordance with examples 1 through 9 and the commercial oxidation catalytic converter in accordance with the comparison example 1 cylindrical sample bodies with a diameter of 24 and a length of 52 mm are hollowed out by drilling. The sample bodies are tested in an activity measuring station using synthetic gas as regards their sorption and oxidation activity in a manner dependent on temperature. The composition of the synthetic gas is: 750 ppm NO, 50 ppm $NO_2$: 20 ppm $SO_2$, 1% $H_2O$, 5% $O_2$, remainder $N_2$.

The following model substances are employed for the HVOC's:

Class A:
  propene, $C_3H_6$ (20 ppm)
  formaldehyde, $CH_2O$ (20 ppm)
Class B:
  decane, $CH_{10}H_{22}$ (10 ppm)
  acetic acid, $CH_3COOH$ (20 ppm).

In preliminary tests it was demonstrated that decane is substantially more difficult to sorb and oxidize than the class C HVOC's and than the SOF's. Acetic acid is more difficult to sorb and oxidize than the higher alkylcarboxylic acids, as for instance butyric acid, which have a pungent odor with extremely low odor threshold values.

EXAMPLE 13

Measurement of Activity in an Engine Testing Station.

SO catalytic converter honeycomb structures in accordance with examples 2 through 6 with a diameter of 280 and a length of 250 mm and the oxidation catalytic converter V1 are tested on an engine test station. The station is equipped with a 6 cylinder DI turbo diesel engine (163 KW, displacement 6.6 liters) and an eddy current brake. The fuel employed for testing contains 0.03% sulfur. As part the 13 stage test European Community regulations 88/77/, HC, CO and particle mass flows are measured. For HC determination FID instruments of the Testa Company are used. The measurements are performed at 190° C. CO is measured with an NDIR instrument of the Horiba Company. The particle mass is gravimetrically measured using a NOVA mini dilution tunnel in diluted exhaust gas at 52° C. Aldehyde is measured using the DNPH method. The fraction of the SOF (soluble organic fraction) in the particle mass is determined gravimetrically after extraction with $CH_2Cl_2$. The sulfate fraction of the particles is measured by ion chromatography after extraction with ispropanol/$H_2O$.

TABLE 1

Overview of examples*

| # | % by weight | | | g/dm³ | | Remarks |
|---|---|---|---|---|---|---|
|  | $V_2O_5$ | $WO_3$ | $MoO_3$ | Pt | Pd |  |
| 1 | 3 | 9 |  |  |  |  |
| 2 | 3 | 9 |  |  | 0.35 |  |
| 3 | 3 | 9 |  | 0.071 |  |  |
| 4 | 3 | 9 |  | 0.35 |  |  |
| 5 | 3 | 9 |  | 0.071 | 0.35 |  |
| 6 | 3 | 9 |  |  |  | Washcoat (200 g/l) |
|  | 3 | 9 |  |  | 0.35 | Carrier (active) |
| 7 | 3 |  | 6 |  |  |  |
| 8 | 3 |  | 6 | 0.071 | 0.35 |  |
| 9 | 3 | 4.5 | 3 |  |  |  |
| 10 | 3 | 4,5 | 3 | 0.071 | 0.35 |  |
| 11 | 3 | 9 |  | 0.071 | 0.35 | Washcoat (500 g/l) Cordierite carrier (inactive) |
| V1 | ** |  |  |  | 1.8 | Commercial diesel oxide catalytic converter |

*honeycomb structure with a cell division of 31 cells/cm²
**may contain small amounts of $V_2O_5$

TABLE 2

Decane sorption/oxidation activity (in %) at 100° C. of the SO catalytic converters.
Examples 1–11 and of the comparison example after 3 hours of subjection to 20 ppm $C_{10}H_{22}$ - space velocity 13,000 per hour.

| Example | Sorption | Oxidation | Slip |
|---|---|---|---|
| 1 | 56 | 8 | 36 |
| 2 | 65 | 11 | 24 |
| 3 | 67 | 13 | 20 |
| 4 | 66 | 22 | 12 |
| 5 | 70 | 13 | 17 |
| 6 | 73 | 15 | 12 |
| 7 | 54 | 9 | 37 |
| 8 | 69 | 13 | 18 |
| 9 | 53 | 10 | 37 |
| 10 | 73 | 12 | 15 |
| 11 | 66 | 18 | 16 |
| V1 | 0 | 0 | 100 |

TABLE 3

Maximum CO concentration formed on heating (100° → 250° C. in 20 minutes) of SO catalytic converters subjected to decane (20 ppm, 3 hours, 100° C., examples 1–11) space velocity = 25,000 per hour.

| Example | CO (ppm) |
|---|---|
| 1 | 250 |
| 2 | 35 |
| 3 | 25 |
| 4 | 19 |
| 5 | 20 |
| 6 | 21 |
| 7 | 260 |
| 8 | 23 |
| 9 | 245 |
| 10 | 20 |
| 11 | 18 |

TABLE 4

Results of particle measurements (g/kWh) in the 13 stage test using various SO catalytic converters and a commercial oxidation catalytic converter.

| | Overall particle mass | SOF | Insoluble residue | Sulfate + water |
|---|---|---|---|---|
| Without catalytic converter | 0.35 | 0.15 | 0.18 | 0.02 |
| Example 2 | 0.31 | 0.02 | 0.17 | 0.12 |
| Example 3 | 0.34 | 0.03 | 0.17 | 0.14 |
| Example 4 | 0.52 | >0.01 | 0.17 | 0.35 |
| Example 5 | 0.32 | >0.01 | 0.17 | 0.15 |
| Example 6 | 0.21 | >0.01 | 0.16 | 0.05 |
| Comparison example VI | 0.86 | 0.08 | 0.18 | 0.6 |

The present invention is, of course, in no way restricted to the specific disclosure of the specification and drawings, but also encompasses any modifications within the scope of the appended claims.

We claim:

1. A sorption catalytic converter for combined sorptive and oxidative cleaning of exhaust gases of a diesel engine, said catalytic converter having a blocking activity for highly volatile organic exhaust gas components, mainly HC, as well as moderately and slightly volatile organic exhaust gas components, mainly HC, and said catalytic converter further having oxidative activity for CO and an inhibited oxidative activity for $SO_2$ and NO; said catalytic converter comprising:

a converter body consisting of a doped catalytically active material, said doped catalytically active material comprised of a solid acid system $V_2O_5/SiO_2/TiO_2/Al_2O_3/SO_4^{2-}/PO_4^{3-}$ of a high surface area doped with at least one metal oxide of a metal of the platinum group of the periodic table for increasing a blocking activity of said converter body.

2. A catalytic converter according to claim 1, wherein said converter body is in the form of a honeycomb structure and wherein said honeycomb structure is made of 300–1400 g of said doped catalytically active material per liter volume of said honeycomb structure.

3. A catalytic converter according to claim 2, wherein said honeycomb structure is made of 400–800 g of said doped catalytically active material per liter volume of said honeycomb structure.

4. A catalytic converter according to claim 1, wherein said converter body is in the form of a honeycomb support structure, wherein said doped catalytically active material is in the form of a coating applied to said support structure and wherein said coating is made of 200–800 g of said doped catalytically active material per liter volume of said honeycomb support structure.

5. A catalytic converter according to claim 3, wherein said coating is made of 300–600 g of said doped catalytically active material per liter volume of said honeycomb support structure.

6. A catalytic converter according to claim 1, wherein said doped catalytically active material contains 0.001% to 0.1% of said at least one metal oxide of a metal of the platinum group.

7. A catalytic converter according to claim 1, wherein said solid acid system further comprises $WO_3$.

8. A catalytic converter according to claim 7, wherein said solid acid system further comprises $MoO_3$.

9. A catalytic converter according to claim 1, wherein said solid acid system further comprises $MoO_3$.

10. A catalytic converter according to claim 1, further comprising an additional catalytically active material applied as a coating to said doped catalytically active material, said additional active material having a different chemical composition than said doped catalytically active material, wherein said additional catalytically active material has a different pore structure than said doped catalytically active material.

11. A catalytic converter according to claim 10, wherein a pore volume of said additional catalytically active material is greater than 35%.

12. A catalytic converter according to claim 10, wherein said additional catalytically active material is free of platinum.

* * * * *